United States Patent Office 2,781,344
Patented Feb. 12, 1957

2,781,344
FORMYLATION OF AMINO-PYRIMIDINES

Frederick Comte, Kirkwood, Mo., assignor to Monsanto Chemical Company, St. Louis, Mo., a corporation of Delaware No Drawing. Application May 4, 1953,
Serial No. 352,970

9 Claims. (Cl. 260—256.4)

This invention relates to the preparation of intermediates useful in the synthesis of purines and more specifically pertains to an improved method of formylating a 4,5-diaminouracil or salts thereof.

In the synthesis of purines such as xanthine, caffeine, theobromine, theophylline, among others, it has been the practice to prepare a six-membered heterocyclic compound containing an amino group attached to each of two adjacent ring carbon atoms. In a subsequent step the diamine has been reacted with formic acid to prepare a heterocyclic compound having a formamido and an amino group attached to two adjacent ring carbon atoms. The formamido-amino substituted heterocyclic compound has then been subjected to conditions promoting ring closure whereby, through the splitting out of water involving the amino group and the formyl group, ring closure occurs. By employing this general procedure there has been prepared purines containing the structure

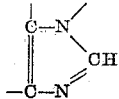

wherein the two carbon atoms are also members of a six-membered heterocyclic ring.

The general process described above has been successfully employed in the synthesis of the stimulants caffeine, theobromine and theophylline and can be employed in the synthesis of other 2,6-dioxypurines all of which have the following formula:

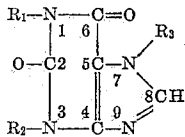

wherein each or any combination of the R groups can be hydrogen or an alkyl group. In the preparation of the 2,6-dioxypurines a formamido-amino uracil is subjected to conditions promoting ring closure. The formamido-amino uracil intermediate having been prepared by the formylation of a diaminouracil.

Several methods have been proposed for the preparation of the formamido-amino uracil employed as an intermediate in the synthesis of purines. One method previously suggested involves the reaction of the diaminouracil as a free base with concentrated formic acid. Another process employs an acid salt of the diaminouracil with concentrated formic acid together with sodium formate and sulfuric acid. In these processes the formic acid employed is of about 50% to 90% by weight formic acid with the remainder being water. All of these processes employed a substantial excess of formic acid, i. e. from 10 to 30 equivalents of formic acid per equivalent of the diaminouracil. The yields of the desired formamido-amino uracil obtained from these processes are low.

Recently methods for preparing formamido-amino uracils by reacting a diaminouracil or its acid salt with dilute aqueous formic acid of a concentration of from 2% to 37% by weight have been proposed. These processes employ more nearly the theoretical amount of equivalents of formic acid per equivalent of the diaminouracil required for formylation. A slight excess of formic acid, in the range of 1 to 5 equivalents of formic acid per equivalent of the diaminouracil, are said to give the best yields. Acid salts, such as the sulfuric, phosphoric, or hydrochloric acid salts, of the diaminouracils are employed in the dilute formic acid processes together with sodium formate which reacts with the acid portion of the salt and liberates formic acid.

Although the latter processes employing dilute formic acid were a substantial improvement over the expensive lower yield producing processes employing excessive quantities of concentrated formic acid, the formamido-amino uracil product obtained therefrom contained impurities from which substantially pure, white dioxypurines could not be made. In the synthesis of caffeine from 4-amino-5-formamido uracil produced by the dilute formic acid processes, the caffeine recovered is off color ranging from yellow to green. To produce a white caffeine, the crude caffeine product had to be purified by a time consuming and expensive process which also resulted in an appreciable loss of caffeine.

An object of this invention is to provide an improved method of formylating diamino compounds which are useful as purine intermediates. Another object of this invention is to provide an improved method of formylating diamino compounds whereby the resulting formamido-amino uracil product is substantially pure and white and from which a dioxypurine can be produced as a substantially pure white product. Other objects will become apparent from the following description and examples.

The objects of this invention can be occomplished by the discovery that heterocyclic amino compounds containing at least one amino group attached to each of two adjacent ring carbon atoms of a six-membered heterocyclic ring containing four carbon atoms and two nitrogen atoms as in the following pyrimidine type structure:

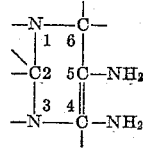

as well as acid salts of said diamines can be formylated to produce excellent yields of the corresponding formamido-amino compounds by heating together said diamine or acid salt thereof and an aqueous formic acid composition containing from 1 to 5 equivalents of formic acid per equivalent of diamine in the presence of an inert gas and in the presence of nascent hydrogen. These heterocylclic diamine reactants can be considered as derivatives of pyrimidine, dihydropyrimidine and tetrahydropyrimidine. The free valences of the carbon atoms in the 2 and 6 position can be attached to an oxo oxygen as in a carbonyl group or one valence of each of these carbons can be part of a double bond between these carbons and the 3,1 nitrogens respectively while the other valences can be attached to hydrogen, amino group, hydroxyl group, or an alkyl group.

In a particular embodiment of this invention employed to prepare 4-amino-5-formamido uracils, it is preferred to heat the 4,5-diaminouracil or its acid salt and formic acid at a temperature in excess of 80° C. and more specifically in the range of 80° C. to the boiling point of the reaction mixture, about 102° to 103° C. Higher temperatures, 110° C. and above, can be employed if desired when the reaction is conducted above atmospheric pressure.

When one equivalent of the acid salt of the diamine, such as the sulfuric acid salt, the phosphoric acid salt or the hydrochloric acid salt, is employed, up to one equivalent of the formic acid can be replaced with sodium formate. For example, one equivalent of a diamino sulfate such as 4,5-diaminouracil sulfate or 1,3-dimethyl-4,5-diaminouracil sulfate or 4,5-diaminopyrimidine sulfate or 3-methyl-4,5-diaminouracil sulfate can be heated with an aqueous solution containing one equivalent of sodium formate and 0 to 4 equivalents of formic acid in the presence of an inert gas and in the presence of nascent hydrogen. When the free base is employed, sodium formate may be eliminated. Also when the reaction mixture is heated to a temperature above 100° C., the process is carried out under reflux conditions.

The reactants may be mixed at a temperature below the reaction range and thereafter heated to the desired reaction temperature. By an alternative procedure, the aqueous formic acid composition is prepared, heated to the desired reaction temperature in the presence of an insert gas and the diamino compound and the agent producing nascent hydrogen added to the formic acid composition. The reaction time will vary somewhat according to the reaction temperature employed as will be readily understood. In general, when the process of this invention is carried out at temperatures of from 90° to 110° C. the reaction is substantially complete in 1½ to 3 hours. The reaction time is somewhat longer when the reaction is carried out at lower temperatures. It is desirable, although not essential, to agitate the reaction mixture during the course of the reaction.

The sodium formate-formic acid solution is desirably prepared by adding sufficient concentrated sulfuric acid to an aqueous sodium formate solution to produce in the solution a concentration of formic acid in the range of 1–5% or higher. This solution may then be used in sufficient quantity to provide the proper equivalent ratio in the range of 5 to 1 of formic acid to the diamine or diamine acid salt in the process of this invention. This procedure of preparing the sodium formate-formic acid solution avoids the use of concentrated formic acid where the use of this concentrated acid is deemed undesirable. The sodium formate-formic acid solution can be prepared by combining the required amount of sodium formate with dilute formic acid or with concentrated formic acid and diluting the resulting aqueous composition to the desired concentration.

In the formylation of the sulfate of a diamino compound as hereinbefore defined with dilute aqueous sodium formate-formic acid solutions, the sodium formate component of the reaction mixture may be reduced substantially from one mole to a one-half mole or even less and may be eliminated entirely. On the other hand, an excess of sodium formate, for example an excess of 5% or more, may be employed. As a further embodiment of the process of this invention, the acid salt of the diamino compound may be heated with sodium formate in the ratio of one equivalent of the diamine to one equivalent of sodium formate and thereby avoid the addition of any formic acid per se to the reaction mixture. In employing formic acid solution, it is desirable to use it in a ratio of 1 to 3 equivalents of formic acid to one equivalent of diamine and not to exceed 5 equivalents of formic acid since the formamido-amino product has an appreciable solubility in the resulting concentration of formic acid and thereby renders the recovery of the product more difficult. Likewise in formylating an acid salt of the diamine the ratio of formic acid or combined sodium formate-formic acid is desirable used in a ratio of 3 equivalents to one equivalent of the diamine acid salt and not exceeding 5 equivalents for the same reason.

After the reaction has been completed, the reaction mixture may be treated in any suitable manner for the recovery of the formamido-amino product. For example, the reaction mixture may be cooled to at least 40° C. or below and the solid product can then be recovered from the reaction mixture by filtering the resulting slurry and washing the filter cake with water to remove the residual mother liquor. The washings and the mother liquor are discarded even though they may contain some formic acid. The formamido-amino product may be dried if desired or used in the wet state in the synthesis of purines. By the process of this invention the formamido-amino products can be obtained in substantially quantitative yields, 90% or more of theory, and can be obtained in a substantially pure white crystalline state.

Typical of the 4,5-diamino reactant hereinbefore defined are 4,5-diaminopyrimidine and the 4,5-diaminouracils which possess the formula

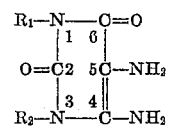

wherein $R_1$ and $R_2$ are hydrogen or alkyl groups. The preferred diamino compounds include 4,5-diaminouracil (all R groups are hydrogen), 1-methyl-4,5-diaminouracil, 3 - methyl - 4,5 - diaminouracil, 1,3 - dimethyl - 4,5 - diaminouracil, 1,3-diethyl-4,5-diaminouracil, 1,3-di-n-propyl-4,5-diaminouracil, 1,3-dibutyl-4,5-diaminouracil, i. e. where the R groups are hydrogen or alkyl groups containing 1 to 4 carbon atoms.

As hereinbefore stated, the formylation process of this invention is carried out in the presence of an inert gas such as nitrogen and in the presence of nascent hydrogen. In other words, the reaction system must be absolutely free from free or molecular oxygen. A simple method for providing the necessary nascent hydrogen is to introduce into the reaction medium a small quantity, generally from 0.02 to 0.2 mole, of a metal which reacts with an acid to liberate hydrogen, i. e. a metal above hydrogen in the electromotive force series. Obviously, such extremely active metals as lithium, potassium, calcium, sodium and the like would likely also react with the 4,5-diaminopyrimidine reactant and hence would not be practical. However, such readily available metals as aluminum, magnesium, zinc, iron and nickel can be added to the reaction medium to supply the nascent hydrogen. Of these metals zinc is preferred. The zinc can be added as dust, granules, turnings, chips, bars, rods or in any other solid form. An internally zinc lined reactor, or a reactor having zinc baffle plates can be employed for a long period of time as a reactor for the process of this invention, for the presence of the zinc in such forms will liberate hydrogen slowly for many batch formylation processes.

The following examples will serve to illustrate the process of this invention. In these examples the term "parts" is employed to indicate parts by weight.

*Example I*

To a glass lined reaction vessel fitted with an agitator reflux condenser and suitable charging lines and ports there is charged 1.3 parts (0.02 mole) of zinc dust and an aqueous solution containing 14.2 parts (0.1 mole) of 4,5-diaminouracil and 128 parts of water. The resulting mixture is stirred slowly, evacuated to about 30 mm. Hg for about 10 minutes, charged with nitrogen to a pressure of about 20 pounds, and the nitrogen is released until a gage reading of about 2 pounds is obtained. The reactor is charged with nitrogen to 20 pounds and purged to 2 pounds three more times to reduce the oxygen introduced by charging the reactor. The atmospheric outlet of the reflux condenser is connected to a bubbler. To the purged mixture in the reactor there is added 11.3 parts of aqueous solution containing 9.6 parts (0.21 mole) of formic acid and 1.7 parts of water. The resulting reaction mixture contains 2 equivalents of formic acid per equivalent of the diaminouracil and is equivalent to a 6.9% formic acid solution in water. As soon as the formic acid is added, a precipitate forms which is probably the formate of the diamine. The reaction mixture is heated to reflux, about 100° to 102° C., with stirring and maintained under reflux conditions for about 3 hours. The reactor outlet to the reflux condenser is opened slowly when the reaction mixture reaches about 80° C. All during reflux hydrogen will pass through the bubbler. At the end of the 3 hour reflux period, the resulting reaction mixture is cooled to about 30° C. as rapidly as possible with stirring and a small quantity of nitrogen is bled into the space above the reaction mixture to maintain a hydrogen concentration at least 20% below the lower explosive limit (about 1% by volume).

The slurry of crystalline 4-amino-5-formamidouracil which forms on cooling the reaction mixture is removed from the reactor and filtered to recover the formylated product. The crystalline product is washed with 30 to 35 parts of fresh water. The product is white and has a crystal size comparable to that of particles of silica sand. The yield is substantially quantitative.

The product obtained above is methylated with methyl chloride and ring closure, the reaction involving the 4-amino group and the 5-formamido group, occurs to yield crystalline caffeine. The crystalline caffeine is washed and dried. This caffeine when observed under ultraviolet light shows no fluorescence.

Example II

The process described in Example I is repeated except that no zinc was employed. A yield of 4-amino-5-formamidouracil of only about 86% was obtained. The formylated product although crystalline has a yellowish color and the caffeine made therefrom is yellow-green in color.

Example III

The process described in Example I is repeated except that the zinc is reduced to 0.65 parts (0.01 mole), a 37% formic acid solutiodn containing 0.21 mole of formic acid is added in place of the 85% formic acid and additional water is added to bring the formic acid concentration in water down to about 2%. By this process there is also obtained white crystalline 4-amino-5-formamidouracil in a yield comparable to that of Example I.

Example IV

The process of Example I is repeated except that the zinc is charged as mossy zinc. The product obtained by this process is also a white crystalline product in a yield comparable to that of Example I.

The products of Examples III and IV when converted to caffeine yield a white crystalline product. However the product of Example II when converted to caffeine yields a yellow to green crystalline product.

Example V

The process of Example I is repeated except that 0.1 mole of 4,5-diaminopyrimidine is substituted for 4,5-diaminouracil. A yield of substantially pure 4-amino-5-formamidopyrimidine comparable to that of Example I is obtained. This formylated product can be converted to substantially pure purine.

Example VI

The process of Example I is repeated except that 0.1 mole of 3-methyl 4,5-diaminouracil is substituted for 4,5-diaminouracil. An excellent yield of substantially pure, white 3-methyl-4-amino-5-formamidouracil which can be methylated to substantially pure, white theobromine (3,7-dimethyl xanthine) or to caffeine (1,3,7-dimethyl xanthine).

Example VII

The process of Example I is repeated except that 0.1 mole of 1,3-dimethyl-4,5-diaminouracil is substituted for 4,5-diaminouracil. From this process an excellent yield of substantially pure, white 1,3-dimethyl-4-amino-5-formamidouracil can be recovered which can be converted to white, crystalline theophylline (1,3-dimethylxanthine) by ring closure involving the formamido and amino groups by splitting out water. Or this formylated product can be methylated under conditions which ring closure also takes place to prepare a substantially pure, white caffeine.

Example VIII 1,3-diethyl-4-amino-5-formamidouracil is prepared in excellent yields a substantially pure, white crystalline product by substituting 0.1 mole of 1,3-diethyl-4,5-diaminouracil for 4,5-diaminouracil in the process described in Example I.

Example IX 1,3-di-n-propyl-4-amino-5-formamidouracil is prepared in excellent yields as a substantially pure, white crystalline product by substituting 0.1 mole of 1,3-di-n-propyl-4,5-diaminouracil for 4,5-diaminouracil in the process described in Example I.

The following examples illustrate the process of this invention as employed in an industrial process for the synthesis of caffeine where the diaminouracil is obtained from the prior step of reducing the isonitroso-imino uracil with hydrogen in the presence of a nickel catalyst.

Example X

The walls of a suitable glass lined reaction vessel similar to that described in Example I are wetted and 36 pounds of zinc dust (0.55 pound moles) is deposited thereon. The reactor is immediately closed and evacuated to about 20 mm. Hg. Spent hydrogen gases from the preceding step are charged to the reactor until a positive gage pressure of 20 to 30 pounds is obtained. The reactor is purged to about a pressure of about 2 pounds. The reactor is so purged three times. Then 612 gallons of an alkaline aqueous solution containing 2.85 pound mole equivalents of 4,5-diaminouracil and 5.70 pound mole equivalents of sodium hydroxide are charged to the reactor through a filter press which removes the nickel catalyst employed in the previous step. The filter cake is blown dry with the residual spent hydrogen gas which is allowed to go through to the formylation reactor until a pressure of 20 to 30 pounds is obtained therein.

The contents of the formylation reactor are stirred and heated to 80° C., the pressure reduced to about 2 pounds and 687 pounds of about 85% formic acid containing 12.7 pound moles of formic acid are charged.

The reactor is opened to the reflux condenser and heating is continued until refluxing, 100° C. to 102° C., begins. The reaction mixture is maintained under reflux conditions for about three hours and then cooled to 30° C. or below with stirring. The vapor space in the reactor is purged to insure a hydrogen concentration reaction of at least 20% or more below the lower explosive limit (1.00% hydrogen). The slurry that forms in the cooled reaction mixture is discharged from the reaction vessel, filtered to recover the crystalline 4-amino-5-formamidouracil produced and the porous filter cake is spray-washed with 160 gallons of fresh water. The yield of the formylated product is about 450 pounds or 93% of the theoretical yield based on the diamine charged.

Example XI

The walls of a suitable glass lined reaction vessel similar to that described in Example I are wetted and 25 pounds of zinc dust is deposited thereon. The reactor is immediately closed and evacuated and purged as described in Example X. Then 580 gallons of an aqueous alkaline solution from the hydrogenation process are charged to the reaction vessel as described in Example X. This alkaline solution contains about three pound mole equivalents of 4,5-diaminouracil. The contents of the formylation reactor are stirred and heated to about 80° C. while the pressure in the reactor is reduced to about two pounds. At this time there is charged to the reactor 245 gallons of a 37% by weight sodium formate solution and 144 gallons of 41% sulfuric acid providing the equivalent of 606 pounds (13.2 pound moles) of formic acid. The resulting reaction medium is equivalent to a 8% by weight aqueous formic acid solution. The reactor is opened to the reflux condenser and heating of the reaction medium is continued until refluxing begins about 102° C. The reaction mixture is maintained under reflux conditions for about three hours and then cooled to 30° C. or below with stirring. The same precautions are taken in this process to insure a non-explosive atmosphere in the vapor space in the reactor as was described in Example X. The slurry of 4-amino-5-formamidouracil resulting from the cooling of the reaction medium is discharged from the reactor to a filter and the porous filter cake is spray-washed with fresh water. The yield of the formylated product is 91% of the theoretical yield based on the diamine charged.

Each of the formamido products obtained from the processes described in Examples X and XI is charged to the methylation process for conversion to caffeine. The caffeine product obtained from these formamido products is a substantially pure, white crystalline product.

The processes described in Example I and Example X can be further modified by substituting a sulfuric acid salt of 4,5-diaminouracil for the free base. In this process an aqueous formic acid solution containing both formic acid and sodium formate would be charged to the formylation reactor to provide the necessary equivalents of formic acid for the reaction. The amino formamido product obtained from this process is also a substantially pure, white crystalline product and can be converted to a substantially pure, white crystalline caffeine.

What is claimed is:

1. In the process of preparing an amino-formamido derivative of a compound selected from the class consisting of 4,5-diamino pyrimidine, 4,5-diamino uracil, 1 and 3 lower alkyl substituted 4,5-diamino uracils and acid salts of said uracils, by the reaction of said compound with formic acid; the step comprising carrying out said formylation reaction with from 1 to 5 equivalents of formic acid in the presence of nascent hydrogen and in the presence of an inert gas.

2. The process of claim 1 wherein the diamine is a 4,5-diamino-alkyl substituted uracil.

3. The process of claim 1 wherein the diamine is 4,5-diaminouracil.

4. The process comprising heating in the presence of nascent hydrogen and in the presence of an inert gas at a temperature above 80° C. in an aqueous medium a substance selected from the group consisting of 4,5-diamino pyrimidine, 4,5-diamino uracil, 1 and 3 lower alkyl substituted 4,5-diamino uracils 4,5-diamino-pyrimidines, 4,5-diaminouracils and the acid salts thereof, with formic acid in the proportion of 1 to 5 equivalents of formic acid per equivalent of said diamine, and recovering the amino-formamido product from the reaction mixture.

5. The process comprising heating in the presence of nascent hydrogen and in the presence of an inert gas at a temperature above 80° C. in an aqueous medium a substance selected from the group consisting of 4,5-diaminouracils having the formula:

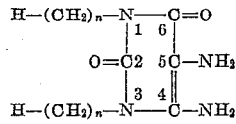

wherein $n$ is an integer from 0 to 4, and the acid salts thereof, with formic acid in the proportion of 1 to 5 equivalents of formic acid per equivalent of said diamine, and recovering the 4-amino-5-formamidouracil product from the reaction mixture.

6. The process comprising heating at a temperature above 80° C. in the presence of nascent hydrogen and in the presence of nitrogen in an aqueous medium 4,5-diaminouracil with formic acid in the proportion of 1 to 5 equivalents of formic acid per equivalent of said diamine wherein the nascent hydrogen is formed in situ by the reaction of a small amount of zinc with a portion of formic acid, and recovering 4-amino-5-formamidouracil from the reaction medium.

7. The process comprising heating at a temperature in the range of 80° C. to 103° C. in the presence of nascent hydrogen and in the presence of nitrogen 4,5-diaminouracil with dilute formic acid solution containing 1 to 5 equivalents of formic acid per equivalent of said diamine wherein said hydrogen is formed in situ by the reaction of a small amount of zinc with a portion of formic acid, and recovering 4-amino-5-formamidouracil from the reaction medium.

8. The process comprising heating at a temperature in the range of 80° C. to 103° C. in the presence of nascent hydrogen and in the presence of nitrogen 4,5-diaminouracil sulfate with a dilute aqueous formic acid solution containing one equivalent of sodium formate and 1 to 4 equivalents of formic acid per equivalent of said diamine sulfate wherein said hydrogen is formed in situ by the reaction of a small amount of zinc with a portion of formic acid, and recovering 4-amino-5-formamidouracil from the reaction medium.

9. The process comprising heating at a temperature in the range of 80° C. to 103° C. in the presence of nascent hydrogen and in the presence of nitrogen 4,5-diaminouracil with dilute aqueous formic acid containing 1 to 5 equivalents of formic acid per equivalent of said diamine, said formic acid being formed in situ by the reaction of sodium formate and sulfuric acid in an aqueous medium wherein the nascent hydrogen is formed in situ by the reaction of a small amount of zinc with a portion of formic acid, and recovering 4-amino-5-formamidouracil from the reaction medium.

References Cited in the file of this patent

UNITED STATES PATENTS

| | | |
|---|---|---|
| 2,536,038 | Comte | Jan. 2, 1951 |
| 2,646,432 | Homeyer | July 21, 1953 |

FOREIGN PATENTS

| | | |
|---|---|---|
| 859,311 | Germany | Dec. 11, 1952 |